Patented Aug. 1, 1939

2,167,708

UNITED STATES PATENT OFFICE 2,167,708

PROCESS OF OXIDIZING AMMONIA

Fred E. Carter, Maplewood, N. J., Stanley L. Handforth, Gordon Heights, Del., and William E. Kirst, Woodbury, N. J., assignors of one-half to E. I. du Pont de Nemours & Company, Inc., Wilmington, Del., a corporation of Delaware, and one-half to Baker and Company, Inc., Newark, N. J., a corporation of New Jersey No Drawing. Continuation of application Serial No. 517,628, February 21, 1931. This application September 25, 1936, Serial No. 102,586

3 Claims. (Cl. 23—162)

This invention relates to catalytic processes involving oxidation and reduction reactions, and more particularly to ammonia oxidation processes, and relates especially to an improved catalyst for carrying out such processes.

This application is a continuation of our application No. 517,628, filed February 21, 1931.

In the most satisfactory processes, for ammonia oxidation as heretofore carried out, the ammonia and oxygen containing gas is passed at an elevated temperature through a catalyst usually composed of platinum or an alloy of platinum and rhodium in the form of a fine wire gauze. At the elevated temperatures at which these catalysts have to operate there is an appreciable loss of valuable catalytic material. While this loss is greatly minimized by the addition of rhodium to the catalyst, the loss is still a factor of cost in the production of nitric acid. These catalysts are susceptible to serious poisoning by even slight traces of certain impurities in the gases. Furthermore, it is sometimes difficult to start or light these catalysts and it requires some time before they will give the maximum efficiency of operation.

An object of this invention is an improved process of oxidizing ammonia. A further object of the invention is the production of a catalyst capable of withstanding the conditions of operation in oxidation processes where high temperatures are required, with less loss of material than with catalysts heretofore known. A further object of this invention is a catalyst capable of giving high conversion efficiencies besides being less susceptible to poisoning than catalysts heretofore proposed for this purpose. A still further object of this invention is a catalyst that will light easily and become activated rapidly. Other objects will appear as the description proceeds.

We have found that certain base metals or base metal oxides can be incorporated in platinum or platinum alloy catalysts and that they will act as promoters and protectors. The metals which we have found most desirable for this purpose are those which under the conditions of operation, that is, at the high temperature and in contact with the normal gas concentrations met with in the ammonia oxidation processes, form a mixture of two or more oxides of different states of oxidation or of the metal and its oxide, which different states of oxidation of the metal are in mobile equilibrium with each other and which equilibrium is influenced by the concentrations of the gases in contact therewith. For example, copper fulfills these conditions as represented by the equation $2Cu_2O + O_2 \rightleftarrows 4CuO$, and the oxide present is an equilibrium mixture of the two oxides even though one of the oxides may greatly predominate. Silver for example forms a mixture represented by the equilibrium $4Ag + O_2 \rightleftarrows 2Ag_2O$. Also such metals or their oxides should not form stable compounds with the platinum metals under these conditions. These metals under the conditions of the operation, though they may be originally in the form of pure metallic alloys, are found to form oxides on the catalyst surface which acts as a protecting film without destroying the catalytic efficiency and in fact act as a promoter and protector in contrast with some metalloids which do form stable compounds with the platinum under these conditions and act as poisons.

Particularly we have found by adding small amounts of copper, silver, cobalt or nickel to platinum or preferably to platinum rhodium alloy that it is much easier to start these catalysts operating and that they obtain a high operating efficiency very quickly. These metals, while they form a protecting oxide film on the catalyst, which decreases the loss of catalytic material, may even increase the catalytic conversion efficiency. On the other hand, they protect the catalyst against poisoning from slight impurities and increase the rapidity of activation of the catalyst. It is apparent also that one or even several of these metals may be combined advantageously. While certain advantages may be derived with the use of extremely small amounts of these base metals or base metal oxides, for example with 0.1 per cent or even below, we preferably use from 0.25 per cent to 20 per cent. It will be apparent, however, that other amounts may be used within the scope of this invention.

In carrying out our invention, we prefer to pass the mixture of ammonia and the oxygen containing gas through a catalyst composed of several layers of fine mesh gauze of one of the foregoing alloys. These layers may take various forms. For example, they may take the form of a cylindrical gauze such as proposed in the Jones and Parsons converter disclosed in U. S. Patent 1,321,376, or they may be in the form of a flat gauze of 2 to 4 layers as described in the Journal Society of Chemical Industry, pages 41 to 43-T, 1922, and used in the United Alkali Company's converter, or the catalyst may be used in the form of a great many layers as described in the co-pending application of some of us, Serial Number 387,559, filed August 21, 1929.

The shape, form or design of the converter does not affect the application of this catalyst provided the temperature of the catalyst is maintained at the proper point and the proper mixture of ammonia and oxygen containing gas is used. In order to obtain the highest efficiency, we prefer to use a mixture of ammonia and air or its equivalent which contains about 10 per cent $NH_3$ and 19 per cent oxygen by volume.

While it is preferable to operate the catalyst at a temperature in the neighborhood of 900° C., the temperature may, of course, vary within the limits usually practiced in ammonia oxidation, (e. g. 650° C. to 1200° C.). While we prefer to operate the process for which this catalyst is adapted at pressures greater than atmospheric known to give the best results with a catalyst containing an alloy of platinum and rhodium, we may, of course, operate the process at atmospheric pressure, or even at a pressure less than atmospheric.

While we have described our invention as applicable particularly to the oxidation of ammonia to oxides of nitrogen, it will be apparent that this catalytic process can be used for various other catalytic oxidation and reduction reactions. For example, the oxidation of sulfur dioxide to sulfur trioxide may be carried out with this type of catalyst. The oxidation of various organic compounds may also be accomplished with this catalyst and even the reduction of many compounds may likewise be carried out.

It will be apparent from the foregoing that many different embodiments of this invention exist and may be practiced without departing from the spirit thereof. It is, therefore, to be understood that we do not limit ourselves to the specific embodiments thereof except as indicated in the appended claims.

We claim:

1. A process of oxidizing ammonia to oxides of nitrogen by means of a catalyst comprising platinum metal alloyed with a metal taken from the group consisting of copper and silver.

2. The process of claim 1 in which the amount of copper is from 0.1 to 20 per cent of the alloy.

3. The process of claim 1 in which the amount of silver is from 0.1 to 20% of the alloy.

FRED E. CARTER.
STANLEY L. HANDFORTH.
WILLIAM E. KIRST.